Aug. 24, 1926.
H. C. FORD
FIRE CONTROL INSTRUMENT
Filed Oct. 27, 1923
1,597,031
3 Sheets-Sheet 2
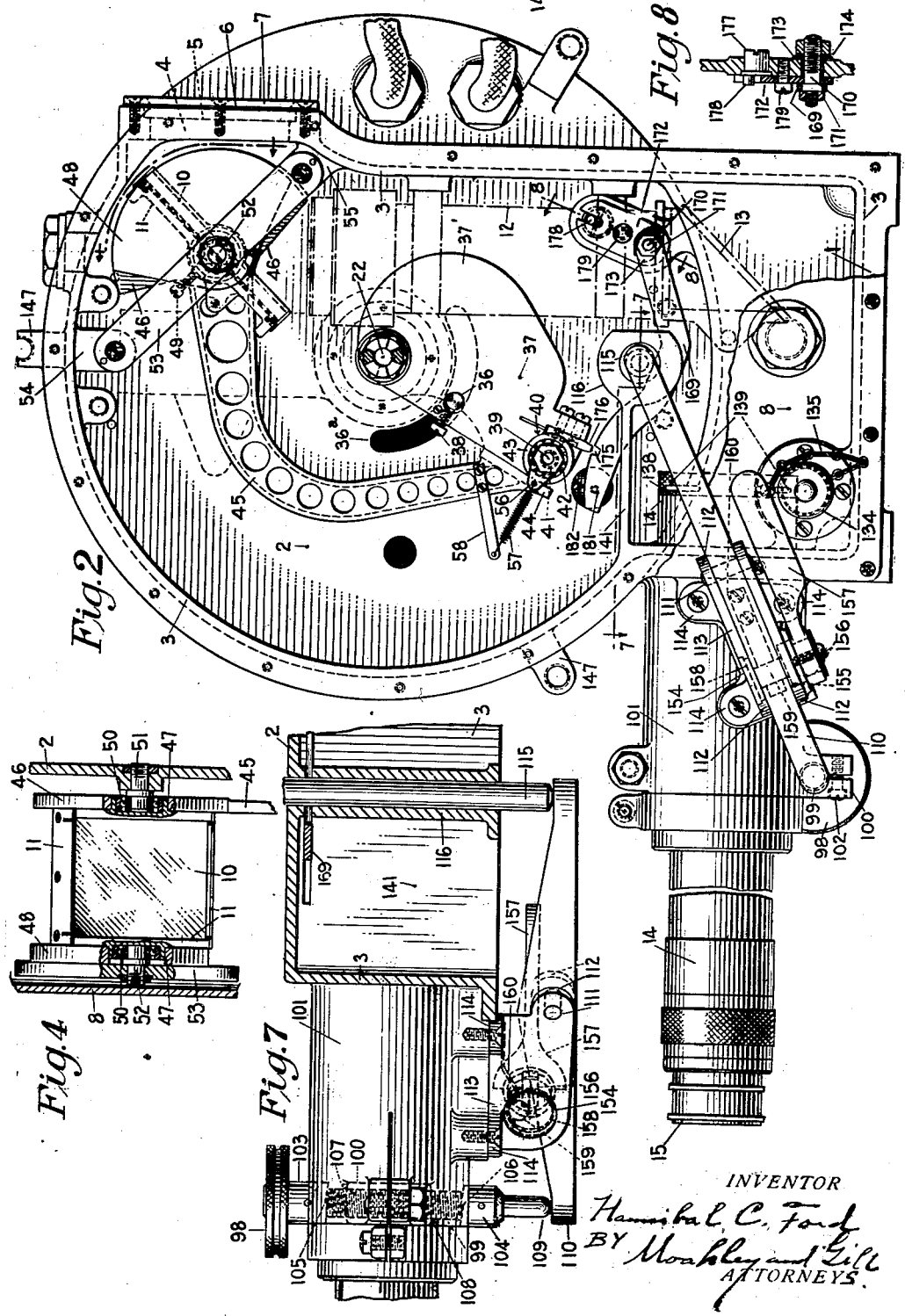
INVENTOR
Hannibal C. Ford
BY Moahley and Gill
ATTORNEYS

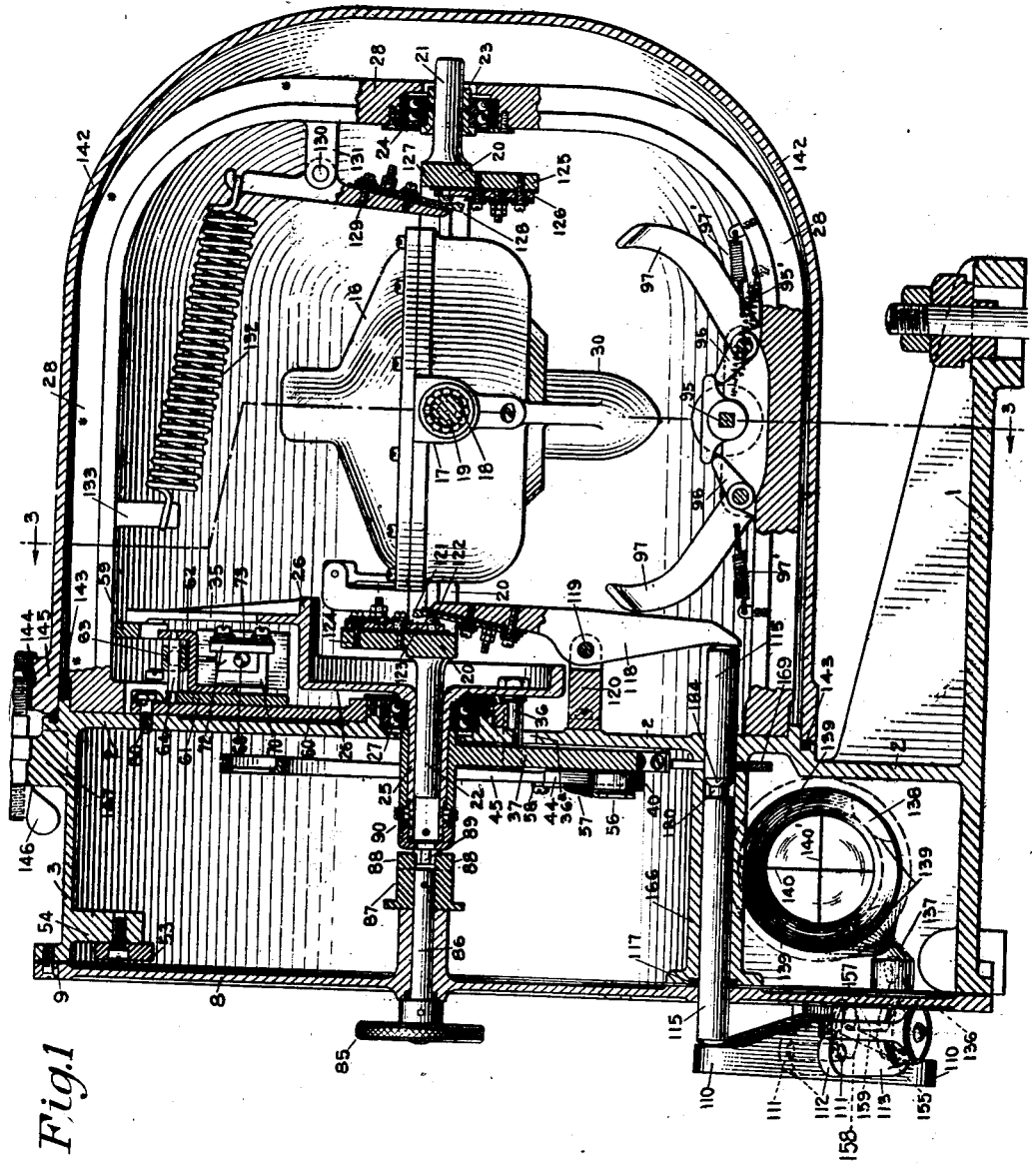

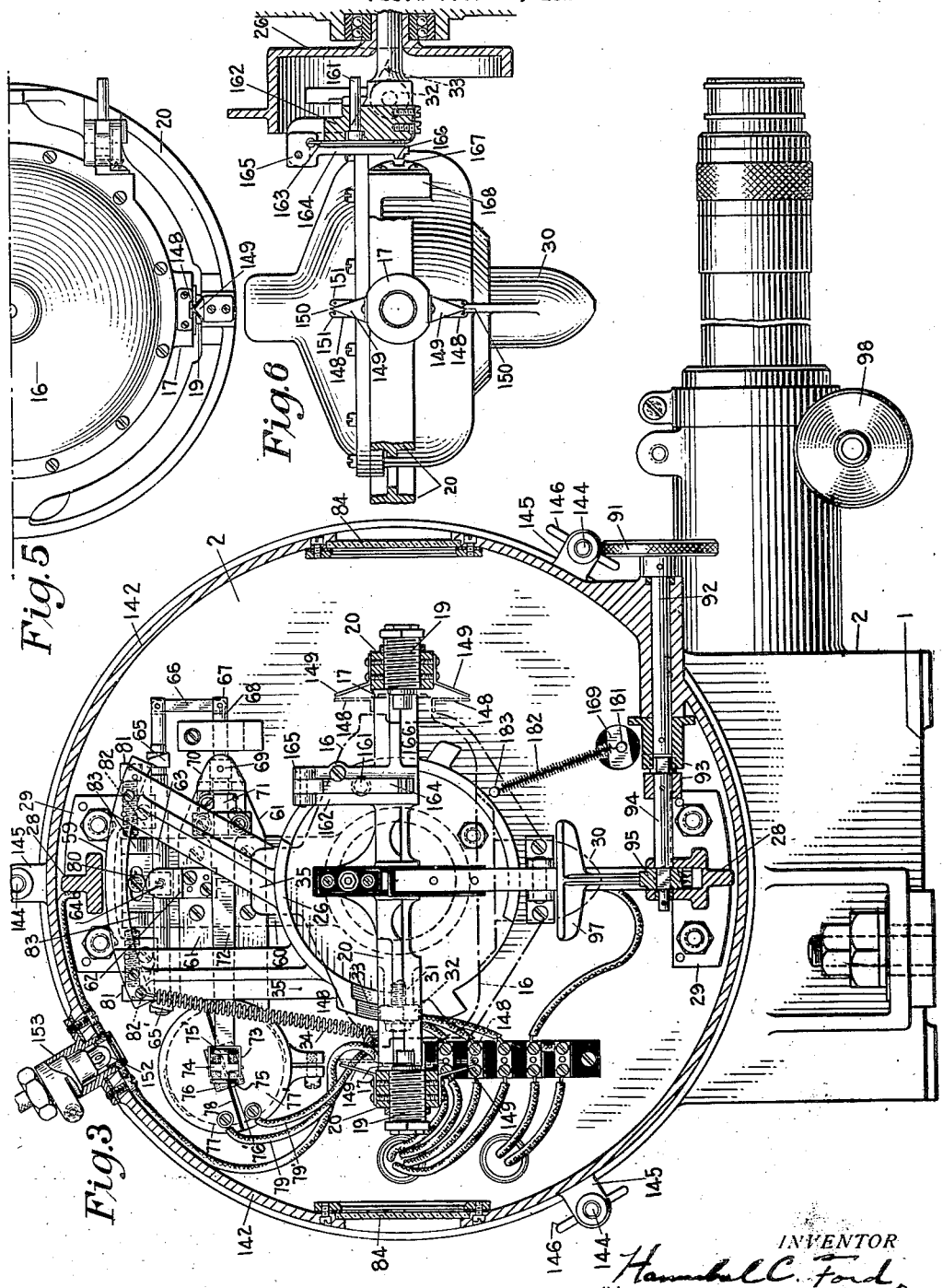

Patented Aug. 24, 1926.

1,597,031

UNITED STATES PATENT OFFICE.

HANNIBAL C. FORD, OF JAMAICA, NEW YORK, ASSIGNOR TO FORD INSTRUMENT COMPANY, INC., OF LONG ISLAND CITY, NEW YORK, A CORPORATION OF NEW YORK.

FIRE-CONTROL INSTRUMENT.

Application filed October 27, 1923. Serial No. 671,125.

This invention relates to instruments for controlling the firing of ordnance, and more particularly to those of the type in which a gyroscope is employed to stabilize or control the elements of a firing mechanism and a coacting optical system, whereby the angle of departure of a projectile is maintained constant with respect to the plane of the horizon, regardless of the oscillatory movement of the body on which the instrument is mounted. In an instrument of this type the coacting parts of the optical system are subject to the identical control, with the result that the image of the target remains stationary in the field of view of the sighting device forming part of the instrument.

In an instrument of the type indicated, the gyroscope and certain other movable parts are subject to entirely different conditions when, on the one hand, the gyroscope is functioning, and, on the other hand when it is not, as when the instrument is out of use. In the former case, the gyroscopic action exercises a control, which, when lacking, leaves the gyroscope and parts intended for control thereby passive. When the latter condition prevails, the undulations which disturb the craft carrying the instrument cause a more or less violent swaying of the passive parts of the instrument, which it is desirable to eliminate.

According to the present invention, alining latching means are provided, by which the gyroscope and the parts connected thereto for gyroscopic control are prevented from unrestrainedly swinging and setting up abrupt reactions detrimental to the instrument, when such control ceases to be exerted. Moreover, the alining latching means maintain the gyroscope and the parts controlled thereby in substantially normal positions, when the instrument is not in service. This keeps the elements of the instrument in correlation for the ready use of the firing mechanism and sighting device, and avoids the necessity of excessively adjusting the position of the gyroscope when the instrument is first brought into use. Instead, the gyroscope may be held in a substantially normal position until it has attained a suitable speed affording the requisite stability, whereupon it may be released from restraint and be permitted to assume control.

Other advantages and features appearing hereinafter, as well as modifications in the details of construction that may readily suggest themselves to those skilled in the art without departing from the spirit of the invention will, of course, be understood to come within the scope thereof as defined by the appended claims.

Referring now to the drawings,

Fig. 1 is a vertical section through the optical and gyroscope chambers of the instrument, the alining latching means being shown partly in elevation and partly in section;

Fig. 2 is an elevational view observed in a direction perpendicular to the left hand end of Fig. 1, most of the cover of the optical chamber being broken away;

Fig. 3 is a sectional view transversely of the gyroscope chamber, being taken on the line 3—3, of Fig. 1, looking in the direction of the arrows;

Fig. 4 is a fragmentary detail view of the stabilized mirror;

Fig. 5 is a plan view of one half of the gyroscope and the ring in which it is mounted, the latching device for the gyroscope being also shown;

Fig. 6 is a detail view in elevation of the gyroscope and its latching device, certain parts being broken away and other parts being shown in section, for the sake of clearness;

Fig. 7 is another detail view, showing means for precessing the gyroscope in a certain direction, and operating mechanism for the alining latching means, the section through the optical chamber being taken on the line 7—7, of Fig. 2; and Fig. 8 is a detail sectional view, taken on the line 8—8 of Fig. 2, of an adjusting arrangement for setting the stabilized mirror with respect to the telescope.

In the drawings, 1 represents the base of a frame, projecting upwardly from which is a wall 2 the lower portion of which is rectangular, this portion merging with a circular upper portion. A wall 3 projects from one side of the wall 2, and, as shown in Fig. 2, substantially follows the contour of the edge of the wall 2, except at one side, where the wall 3 extends upwardly in a single plane for most of its height. In its upper portion on this side, the wall is, however, protruded and formed to possess a window 4, which is closed by a piece of glass 5 and a sealing gasket 6, a bezel 7 outlining the window and being screwed to the metal bordering the same.

The walls 2 and 3 form an optical chamber, which is closed by a cover 8 and a gasket 9, the latter being pressed between the cover and a flange that outlines the open edge of the wall 3, as clearly shown in Figs. 1 and 2. Within the optical chamber is a mirror 10 that is retained in a frame 11. The mirror 10 is positioned so that light rays entering the window 4, including those from a distant object, upon which the instrument may be brought to bear, will be reflected by the mirror into an optical tube 12 that is fastened to an upright portion of the wall 3. The optical tube 12 is part of a bent telescope, the end near the mirror containing its objective lens, and at its lower end the tube is provided with a prism 13 that will again reflect the light rays, this time so that they will enter another tube 14 of the telescope, and be presented to the eye of an observer at the eye-piece 15. In Fig. 2, since the optical tube 12 is of well-known construction, it has been shown in dot and dash lines to produce a phantom effect which permits the clearer illustration of other important parts of the instrument.

Stabilization of the firing mechanism and field of view of the telescope of the instrument is accomplished through the use of a gyroscope 16, shown in full lines in Figs. 1, 5 and 6, and in dot and dash lines for phantom effect in Fig. 3. The gyroscope is preferably of the induction motor type having a rotor adapted to rotate at high speed when the stator circuit is closed, but the electrical connections have not been shown in detail, since this type of gyroscope is well-known in the art, and its particular internal and electrical arrangements form no part of the present invention.

At diametrically opposite points, the casing of the gyroscope 16 is provided with bosses 17, in which ball bearings 18 are carried. Trunnions 19 are adjustably screw threaded into a gimbal ring 20, and have smooth cylindrical portions of reduced diameter which fit into the ball bearings 18. The gimbal ring 20 has trunnions 21 and 22, shown in Fig. 1. The trunnion 21 is slidably mounted in a flanged bushing 23, which has the inner raceway of a ball bearing 24 combind with it. Two annular rows of balls are interposed between the inner and outer raceways of the ball bearing 24.

At the opposite side of the gimbal ring 20, the trunnion 22 is slidable longitudinally in the elongated tubular hub 25 of the cam cylinder 26. The inner raceway of a ball bearing 27 which is similar to the ball bearing 24, is rigidly mounted on the hub 25 of the cam member 26. The outer raceway of this ball bearing is seated in a laterally projecting boss on the wall 2, while the outer raceway of the ball bearing 24 is retained in the central portion of the closed end of a U-shaped bracket 28 which forms part of the frame of the instrument. The ends of the bracket are provided with feet 29 that are bolted or otherwise fastened to one face of the circular portion of the wall 2. The gyroscope 16 has small gravitational stability on the trunnions 19 due to the weight 30, and the trunnion axis 19—19 is below the trunnion axis 21—22 to give increased stability about the latter axis.

Rotatable on a stud 31, shown in dotted lines in Fig. 3, is a roller 32, the stud being screwed into a boss that is formed on the gimbal ring 20. The member 26 has an inclined cam portion 33, shown in Figs. 3 and 6, which is maintained in tangential contact with the roller 32 by a spring 34 shown in Fig. 3. At one end, the spring 34 is attached to the gimbal ring, its other end being connected to one of a pair of arms 35, which are integral with and project upwardly from the cam member 26. The relation between gimbal ring 20 and the cam member 26, due to the spring tension, is one of substantial unification, except when there is relative movement between the roller 32 and incline 33, as and for the purpose hereinafter explained.

Under normal working conditions, the spinning axis of the rotor of the gyroscope occupies a substantially vertical position. The trunnions 19, which enter the ball bearings in the bosses 17, so connect the gimbal ring 20 to the gyroscope 16 that the gimbal ring is stabilized about the trunnions, axis 21—22. In view of the tension of the spring 34, there is no relative change of position between the roller 32 and the inclined cam portion 33 of the member 26 except as explained later, and, therefore, the member is also stabilized. A stud 36 is clamped to the end wall or web of the member 26, as shown in Fig. 1, and projects through a curved slot 36ª in the wall 2 and into an aperture in a trigger plate 37. By means of a set screw 38, the stud 36 is rigidly combined with the trigger plate 37, effecting the stabilization of the latter, which has a counterbalancing portion 37', thus avoiding improperly affecting the gyroscope.

Mounted on a stud 39 carried by the trigger plate 37 is a roller 40, comprising an inner raceway annulus 41, annularly arranged balls 42 and an outer raceway annulus 43. The roller 40 bears against a foot 44 of a plurally apertured, bent arm 45 of channel-shaped cross section, which terminates at its upper end in a sector 46, which constitutes a counter-weight for the arm. The combined arm and counterweight, 45—46, is apertured and fitted over one of a pair of hubs 47 which project from opposite sides of the mirror frame 11. A supplementary counterweight 48, in the form of another sector is fitted over the other hub 47 of the mirror frame, and is rotatively adjustable thereon to regulate the balancing of the arm 45, and is held in place by a set screw 49.

In the mirror hubs 47 are ball bearings 50, which are supported on trunnions 51 and 52, the former being affixed to the wall 2 of the frame of the instrument and the latter being secured to a bar 53, which, as shown in Fig. 2, is fastened at its opposite ends to lugs 54 and 55 that project inwardly from the wall 3 of the optical chamber.

A yielding connection is made between the trigger plate roller 40 and the foot 44 of the bent arm 45, which tends to keep these parts drawn together. This connection is made through an arm 56 mounted on the roller stud 39, this arm being connected by a spring 57 to an anchor arm 58 that is fastened to the arm 45. As the trigger plate 37 is stabilized, as previously explained, the arm 45 connected with it in the manner described will be under the control of this plate as will also the mirror frame 11 that is combined with the arm and the mirror 10 that is mounted in the frame.

When the ship rolls there is a relative movement about the axis of the trunnions 21 and 22 of the unstabilized parts of the instrument with respect to the stabilized parts. The bent arm 45, which is the member immediately controlling the position of the mirror 10, has an effective length measured in a straight line from the center of the mirror trunnion 52 to the center of the roller stud 39. The relative application of power, in the form of reaction from the position-maintaining gyroscope 16, is at the end 39 of the effective arm 39—52 just referred to. Such reaction is applied by the trigger plate 37, which has an effective length measured in a straight line from the axis of the trunnion 22 to the center of the roller stud 39. The ratio of the effective arm 22—39 to the effective arm 39—52 is 1:2. As the common ends 39 of both the effective arms have the same degree of relative angular displacement to the unstabilized parts which turn about the trunnion axis 21—22, it follows that the effective arm 39—52 relatively turns through only one-half the number of degrees that the effective arm 22—39 turns through. Therefore, since the trigger plate 37 is held from turning by its connection to the gyroscope 16, the angular movement of the unstabilized parts of the instrument causes the foot 44 of arm 45 to ride on the trigger plate roller 40. The referred to 1:2 ratio of the effective arms of the trigger plate 37 and the arm 45 thus causes the mirror 10 to turn about the axis of its trunnions 51 and 52 one-half as much as the unstabilized instrument parts turn about the gimbal ring trunnion axis 21—22. The angle of the movement of the mirror is consequently equal to one-half the angle of the roll of the ship and the image of a distant object viewed by reflection from the mirror will remain fixed in the field of view of the telescope.

The firing mechanism of the instrument is located in the gyroscope chamber, and is well shown in Fig. 3, certain elements being stabilized by the gyroscope 16 and other elements turning about the gimbal ring trunnion axis 21—22, when the ship rolls. The stabilized portion comprises the cam member 26, two upwardly extending arms 35 thereof and an arcuate bar-like trigger 59 attached to the free ends of the arms.

Encircling the boss on the wall 2 that receives the ball bearing 27 is the ring-shaped end of an angularly adjustable base plate 60, on which is mounted that portion of the firing mechanism the parts of which turn with the instrument about the trunnion axis 21—22 as the ship rolls. Fastened to the base plate 60, as by screws, is a lateral supporting plate 61, which is disposed perpendicularly to the base plate 60. A Z-shaped bracket 62 is attached to the lateral supporting plate 61, and between these two members is a lever 63 pivotally mounted by a fulcrum pin 64 that extends into the supporting plate 61 and the bracket 62, as shown in Figs. 1 and 3.

On the lever 63 at opposite sides of its fulcrum 64 are escapement lugs 65 and 65', shown in Fig. 3, which co-act with the opposite ends of the curved trigger 59 whenever the ship rolls. One arm of the lever 63 is longer than the other and has pivotally connected with it one end of a link 66, the other end of which is pivotally connected to another lever 67. This lever comprises a number of parts, one being a cylindrical rod 68 having a cubical central portion which is combined with a fulcrum pin 69, the opposite ends of which are mounted in the tapering end portions of the lateral supporting plate 61 and a bracket 70 secured thereto. The short arm of the lever 67 extends from the pivotal connection of the link 66 therewith to the center of the fulcrum pin 69.

The long arm of the lever 67 includes that portion of the cylindrical rod 68 that extends to the left of the fulcrum pin 69, as viewed in Fig. 3. On this part of the rod 68 is mounted a bracket 71, and carried thereby but electrically insulated therefrom is a metallic arm 72, which is provided at its free end with a fork 73. A cross-shaped piece 74 is mounted in the free ends of the legs of the fork 73, and on its cross arm that extends longitudinally of the arm 72, contact rollers 75 and 75' are rotatively mounted.

Inasmuch as the base plate 60, the lateral plate 61 and the bracket 62 are among those parts which turn about the gimbal ring trunnion axis 21—22, when the ship rolls, and the trigger 59 is stabilized by the gyroscope 16 through the gimbal ring 20, its roller 32, the cam 33 held thereagainst by the spring 34, the member 26 and the arms 35, one or the other of escapement lugs 65 or 65' will act against an end of the trigger 59 as the ship rolls. The lever 63 will accordingly swing on its fulcrum 64, the link 66 thereby swinging the lever 67 about its fulcrum 69 and causing the forked end of the arm 72 to swing. The contact rollers 75 and 75' are thus made to roll across the the carbon inserts 76 and 76' that are retained in semi-circular contact plates 77 and 77'. The contact plate 77 and its carbon insert 76 are electrically insulated from the contact plate 77' and its carbon insert 76' by an insulating separator 78. This separator, the contact plates 77 and 77' and their carbon inserts 76 and 76' are formed into a rigid circular unit which is removably and adjustably retained in a ring-like end of the lateral supporting plate 61.

To the semi-circular contact 77 is attached, with a screw, an electric conductor 79, a similar conductor 79' being secured to the contact 77'. These conductors are included in an electrical circuit for firing the gun or guns, which circuit is also provided with a circuit-closer or switch (not shown) operable to fire the gun subject to the control of the firing mechanism of the instrument.

By adjusting the angular relation of the insulating separator 78 with respect to the horizontal arm of the cross-shaped piece 74 carrying contact rollers 75 and 75', the duration of the closed condition of the firing circuit may be suitably varied to prevent excessive burning of the contacts, on the one hand, and to insure that the circuit is maintained long enough to energize relays or magnets therein, on the other hand.

For a given gun elevation with respect to the deck of the ship there is but one point in each roll of the ship, at which the relation of the gun to the plane of the horizon is correct for firing the gun to have its projectile hit a target.

Accordingly, the circular unit comprising the semi-circular contacts 77 and 77' and the insulation separator 78 is given such a position that the contact wheels 75 and 75' are both on one side or the other of the insulation 78, except when the ship is at that point of its roll at which the guns should be fired.

In that case, the roller 75 will be on the contact 77, probably in engagement with its carbon insert 76, while the roller 75' will be bearing on the carbon insert 76' of the contact 77'. Then the closing of the firing circuit will be coincident with the passage of the image of the target across the horizontal wire of an ordinary telescope fixed with respect to the deck. Under these conditions, current will flow through one of the conductors, as conductor 79, through the semi-circular contact 77, its carbon insert 76, the roller 75, the cross-shaped piece 74, the other roller 75' carried thereby, the carbon insert 76', the other semi-circular contact 77', the conductor 79' and the remainder of the firing circuit of the gun. Whether the gun will be fired or not depends on whether the previously mentioned additional gun-firing switch has also been closed for that purpose.

To effect an adjustment of the contact wheels 75 and 75' with respect to the insulation 78 and the semi-circular contact plates 77 and 77', in accordance with the point in the roll of the ship at which the firing mechanism should function, a screw 80, shown in Fig. 3, which passes through a slot in the base plate 60, is loosened. A pair of set screws 81, which are threaded through lugs 82 depending from the upper foot 29 of the U-shaped bracket 28, are moved to permit the base plate to turn slightly about the circular boss on the wall 2. The lateral plate 61, the arm 72 and the rollers 75 and 75' are correspondingly shifted, the set screws 81 being brought to bear against a pair of ears 83 to maintain the adjustment, after which the screw 80 is tightened.

In the event of straying of the gyroscope about its axis 19—19, which may be observed through suitable windows, as shown at 84 in Fig. 3, the gyroscope may be made to precess in a direction to correct for such straying. For example, the knob 85 ordinarily centralized by a spring may be operated to turn a short shaft 86, secured to the inner end of which is one-half 87 of a coupling that has prongs 88 which may be thus brought into contact with similar prongs 89 on the other half 90 of the coupling. The coupling half 90 is screwed onto and pinned to the end of the elongated hub 25 of the cam member 26. As already set forth, the member 26 has an inclined cam portion 33, shown in Fig. 6, that is held against the gimbal ring roller 32 by the spring 34, which is shown in Fig. 3, to produce a unifying effect of spring stressed parts. Hence, the turning of the knob 85 produces a torque about the gimbal ring axis 21—22, which causes the gyroscope to precess about the gyro trunnion axis 19—19 to restore it to proper position.

Similarly, the turning of a knob 91, shown in Fig. 3, turns a shaft 92, which drives through another two-part coupling 93 like the one described above, thus turning a further shaft 94 which has a squared portion. On this squared portion is a cam 95 normally centralized by a spring 95' and having reversely directed toes each of which is adapted to actuate the short arm 96 of a bell-crank lever, the long arm 97 of which is T-shaped and held in a retracted position by a spring 97'. When, therefore, the knob 91 is turned in one direction or the other, one of the bell crank levers will be actuated to engage the weight 30 of the gyroscope 16 to exert a torque about the gyro trunnion axis 19—19, which will cause the gyroscope to precess about the trunnion axis 21—22. This precession of the gyroscope will tilt gimbal ring 20 and through roller 32, cam 33, member 26, trigger plate 37 and arm 45 tilt the mirror 10 to alter the stabilized position of the image of the distant object in the field of view of the telescope, in case it is necessary to do so in making adjustments.

Instead of accomplishing this by precessing the gyroscope it may be done by altering the relation between the mirror and the gyroscope. This permits a finer adjustment than can ordinarily be obtained by precessing the gyroscope. For this purpose there is provided another knob 98 on the end of a shaft 99 which is threaded through a split lug 100 formed on a tubular telescope clamp 101 integrally formed with the wall 3. A screw 102 serves to draw the separate portions of the split lug 100 sufficiently together to yieldingly grip the threaded shaft and hold it against unintentional displacement from any position in which it is set.

Limits within which the mirror 10 may be adjusted through the actuation of the knob 98 are established by suitable stops. The knob 98 has a hub 103 which is pinned to an unthreaded portion of the shaft 99, a collar 104 being also pinned to this shaft, as shown in Fig. 7. The inner ends of the hub 103 and the collar 104 are provided with end faces that have a helical disposition, thereby forming a shoulder 105 on the hub 103, and a shoulder 106 on the collar 104. Turning the knob 98 to advance the threaded shaft 99 so as to move the hub 103 toward the lug 100 will eventually carry the shoulder 105 of the hub against a pin 107, thus stopping further advance of the shaft 99. If this shaft be turned to move longitudinally in the opposite direction, the shoulder 106 of the collar 104 will ultimately be brought into engagement with a pin 108, arresting the movement of the shaft.

Projecting beyond the collar 104, the shaft 99 has an unthreaded portion of reduced diameter which terminates in a hemi-spherical end 109. This end co-acts with the end of an inclined lever 110, which is fulcrumed about a pin 111 that passes through the lever 110 and has its terminals fitted into the spaced ears 112 of a bracket 113. This bracket has other ears 114 through which screws pass and enter bosses formed on the tubular telescope clamp 101, thus mounting the bracket 113.

At its upper end, the lever 110 bears against the rounded end of a plunger 115 that is slidable longitudinally in a supporting tube 116, which projects perpendicularly from the face of the wall 2, with which it is rigidly combined, as by being formed integrally therewith, as shown in Fig. 1. The supporting tube 116 extends almost to the cover 8, where its outer end is enlarged and opposed by a boss on this cover, suitable packing 117 being interposed between the end of the tube 116 and the opposing boss on the cover.

The inner rounded end of the plunger 115 engages the lower end of a substantially vertically disposed lever 118 that fulcrums about a pin 119 that passes through the lever and has its ends retained in the ears of the bifurcated end of a bracket 120, which is mounted on the face of the wall 2. Attached to the upper part of the lever 118 is a thrust plate 121 that bears against a hemi-spherical head 122 on another plate 123 that is secured to an upstanding post 124 that is formed on the gimbal ring 20. Also formed on the gimbal ring 20 is a depending post 125 secured to which is a plate 126 which is provided with another hemi-spherical head 127, which bears against a thrust plate 128 carried by the lower end of another lever 129. This lever is fulcrumed on a pin 130 which is retained in a bracket 131 that is rigid with the U-shaped bracket 28. At its upper end, the lever 129 is connected by a spring 132 to a post 133, which depends from the U-shaped bracket 28. From the foregoing, it is apparent that the spring 132 tends to act through the lever 129 to shift in one direction the gimbal ring 20 in its own plane and the gyroscope 16 mounted therein in its plane of rotation. Such shifting is, however, prevented by the immovability of the lever 118, except when the knob 98 is operated.

When the knob 98 is turned in one direction, the spherical end of the threaded shaft 99 pushes one end of the lever 110 outwardly, the opposite end of this lever moving inwardly, so pushing the plunger 115, which turns the lever 118 on its fulcrum 119. In so turning, the upper end of the lever 118 presses the thrust plate 121 which it carries, against the spherical head 122. The gimbal ring 20 is accordingly shifted to the left, in Fig. 1, and the roller 32 carried thereby, (shown in Figs. 1 and 6), co-acts with the cam incline 33 to turn the cam member 26 about the trunnion axis 21—22 relatively to the gimbal ring 20.

Through the stud 36 the trigger plate 37 is caused to have similar rotary movement, resulting, as is apparent from Fig. 2, in the trigger plate forcing the roller 40 against the foot of the arm 45. The consequent displacement of the latter turns the mirror 10 in accordance with the corrective turning of the knob 98, independently of the movement of the mirror due to the stabilizing action of the gyroscope as already explained.

Operated in the reverse direction, the knob 98 retracts the spherical end 109 of the threaded shaft 99. The pull of the spring 132, shown in Fig. 1, on the lever 129 turns the latter so that its thrust plate pushes against the spherical head 127, and causes the gimbal ring 20 and the gyroscope 16 to be shifted to the right. This is possible, since the retraction of the threaded shaft 99 allows the adjacent end of the lever 110 to follow the spherical end 109 of the shaft 99. The opposite end of the lever 110 moves outwardly, and, under the influence of the spring 132, the plunger 115 follows it, being pushed by the lower end of the lever 118, as the upper end thereof is pushed clockwise, in Fig. 1, as the gimbal ring 20 and the gyroscope 16 are shifted toward the right by the spring stressed lever 129. It is obvious that the cam member will, in this case, correspondingly turn in a direction opposite to that previously referred to and that the miror 10 will also be corrected in the reverse direction.

Improved visualization of the relation of the image of the distant object to the cross lines of the reticle of the telescope is attained in the present invention by illuminating these lines. To this end, a removable plug 134, shown in Fig. 2, is inserted and normally retained in an aperture in the cover 8, a chain 135 that is anchored to this cover being attached to the plug 134 to keep it from becoming mislaid. The plug 134 contains a socket for an electric bulb lamp 136, which is encompassed by a light shield 137, from which light rays are allowed to escape toward the adjacent end of the telescope tube 14. The reticle holder 138 is provided, as shown in Figs. 1 and 2, with slits 139 through which the light from the electric bulb enters so that it strikes the engraved edges of the reticle cross lines 140 and 140', thus illuminating them. With this arrangement, there will be no fogging of the image at the focal plane.

The clarity of the image in the telescope is further preserved by the formation of another light shield 141, which is shown in Figs. 2 and 7 to be cast integral with the walls 2 and 3 and with the plunger-supporting tube 116, though it may be separately formed, if desired. Together with the walls 2 and 3, the light shield 141 forms an illumination pocket in the optical chamber, the remainder of this chamber being thus guarded from stray reflections which might enter the telescope and fog the image.

Fitted over the U-shaped bracket 28 is a housing 142, the shape of which corresponds to a generation by a plane having an outline approximating that of the bracket. The housing 142 has a thickened edge outlining its open end, between which and the wall 2 is pressed a sealing gasket 143 that lies in a groove in this wall. Clamping screws 144 are threaded into bushings that line holes in the legs 145 on the housing 142, and have wing nuts 146 threaded onto their opposite ends, which bear against lugs 147 on the optical chamber structure. By turning the wing nuts 146, the housing 142 is drawn into and firmly held in place.

Through the windows 84 in the housing 142 indicators are visible, and they reveal straying of the gyroscope 16 about the trunnion axis 19—19, when it occurs. As shown most clearly in Fig. 6 the indicators comprise upwardly and downwardly extending plates 148 that are fixedly mounted on the casing of the gyroscope 16 and pointers 149 rigidly attached to the gimbal ring 20, preferably on the bosses 17 thereof. Any angular displacement of the gyroscope 16 about the trunnion axis 19—19 will result in the tips of the pointers 149 ceasing to be centralized with respect to V-shaped notches 150 in the free ends of gyroscope-carried plates 148.

Each indicator plate 148 is provided with a pair of luminous paint spots 151 with which the tip of the associated pointer 149 is compared instead of with the notch 150, when the interior of the gyroscope chamber is dark. The interior of the gyroscope chamber is, however, adapted to be illuminated by an electric bulb lamp 152, which is retained in a holder 153 attached to the gyroscope chamber housing 142.

If the gyroscope strays about the trunnion axis 19—19, it may be restored to its correct position by the manipulation in the proper direction of the knob 85. As already set forth, this will exert a torque about the trunnion axis 21—22, causing the gyroscope to precess about the trunnion axis 19—19.

If the gyroscope 16 strays about the trunnion axis 21—22, the gimbal ring 20 will become tilted in proportion to the inclination of the trunnion axis 19—19. The gimbal ring roller 32, acting on the cam incline 33 of the member 26, will then through the previously described connections, shift the mirror 10, thus displacing the image of the distant object with respect to the reticle cross lines, thereby disclosing the straying of the gyroscope about the axis 21—22.

Turning the knob 91 in the proper direction turns one of the T-shaped arms 97, as already explained, causing it to engage the weight 30 of the gyroscope casing thereby exerting a torque about the trunnion axis 19—19. As a consequence, the gyroscope will precess about the trunnion axis 21—22, and in returning to its correct position will readjust the mirror 10, through the already described mechanism, thereby restoring the relation of the image to the cross lines of the telescope.

Because of the continuous restlessness of the water and the consequent rocking of the ship, the bearings and pivots of the stabilized sight would be subjected to unnecessary wear if its moving parts were free, when the instrument is out of use. To prevent this alining latching means are included in the instrument. As shown in Figs. 2 and 7, the bracket ears 112 are provided with registering holes for the reception of an eccentric 154. This eccentric has a lower circular portion 155 that fits in the hole in the lower ear 112 of the bracket, and has a downwardly extending flat-sided lug 156 over which fits a handle 157 for operating the eccentric. The hole in the upper ear 112 of the bracket is countersunk to form a seat for an under-cut shoulder of an upper circular portion 158 of the eccentric 154. Connecting the lower and upper circular portions 155 and 158 is a cylindrical pin 159, which may be integral with the circular portions. The pin 159 is eccentric to the axis which passes through the centers of the circular portions 155 and 158 of the eccentric 154, and travels in a circular path when the handle 157 is operated. A spring 160, which is secured to the bracket 113, has a free end which engages the eccentric pin 159 and holds it in the position shown in Figs. 2 and 7, when the instrument is in use.

When it is desired to stop using the instrument the supply circuit of the gyroscope is opened and at or near the mid-roll of the ship and therefore, when it is upright and on an even keel, and when the speed of the gyroscope is sufficiently reduced the handle is thrown through an arc approximating 180° to a reversed position, thereby causing the pin 159 of the eccentric 154 to engage the adjoining edge of the lever 110, and swing the latter about its fulcrum 111 a greater amount than can the stop-restricted threaded shaft 99, which is actuated by the knob 98. Thus, the upper end of the lever 110 is swung towards the cover 8, pushing the plunger 115 inward, the inner end of the plunger turning the lever 118 about its fulcrum 119. The upper end of the lever 118, through its thrust plate 121 exerts sufficient pressure on the hemi-spherical head 122 to axially slide the gimbal ring trunnions 21 and 22 in the bushing 23 and the cam cylinder hub 25, respectively. The gimbal ring 20 and the gyroscope 16 will consequently be shifted toward the end wall or web of the cam member 26 an amount greater than they can be so shifted by the actuation of the knob 98.

Due to this, a plunger 161, shown in Figs. 3 and 6 as being slidably mounted in a bracket 162 which is integral with the gimbal ring 20, will be moved into engagement with the end wall or web of the cam member 26. Inasmuch as the gimbal ring 20 and the gyroscope 16 continue to be shifted after the plunger 161 engages the end wall of the cam cylinder, a head on one end of the plunger 161 re-acts against a flat spring 163 that is fastened at one end of the gimbal ring 20. The other end of the spring 163 engagingly passes through a close-fitting slit and into a hole in an enlarged rectangular end of a latch lever 164 which is fulcrumed on a pin 165 that has its ends retained in the bifurcated end of the bracket 162. From the point of the engagement of the spring 163 by the walls of the slit to the fulcrum pin 165 there exists, in effect, the short arm of the latch lever 164, the long arm of which is more clearly recognizable and near its lower end is provided with a tongue 166.

Since the gimbal ring 20 and the gyroscope 16 move to some degree after the latch plunger 161 has been stopped by the wall of the cam cylinder 26, the deflection of the spring 163 develops a turning moment about the fulcrum pin 165, which effects the turning of the latch lever 164. Thus, the tongue 166 approaches a notched latch plate 167 that is mounted on a projection 168 of the casing of the gyroscope 16. Ultimately the tongue 166 of the latch lever 164 enters the notch in the latch plate 167 to prevent the gyroscope from swinging about its trunnion axis 19—19 within the gimbal ring 20 as the ship rolls or pitches.

Well shown in Fig. 2 is a peculiarly bent latching lever 169. This lever is pivoted on a stud 170 and retained thereon by a nut 171, the stud passing through a circular hole in an adjusting plate 172 and also through an elongated slot 173 in the wall 2, as shown in Figs. 2 and 8. On the opposite side the wall 2, a spring washer 174 is slipped onto the threaded end of the stud, and a nut bearing thereagainst locks the plate 172 and the stud 171 in fixed position.

Near its free end, the latching lever 169 is guided by the walls of a slot in the light shield 141 and is provided with a notch 175, the walls of which are adapted to embrace a tongue 176 that is detachably clamped in a slit in the trigger plate 37, the slit being enlarged to receive the tongue which is held in place by screws. To properly adjust the notch 175 to the tongue 176, the nut bearing against the spring washer 174 may be loosened, and a screwdriver inserted in the slot in the end of an eccentric shifter 177, which may then be turned a requisite amount. An eccentric pin 178 on the shifter 177 lies in a slot in the adjusting plate 172, and in turning in its circular path, as the shifter 177 is turned, moves the plate 172 about its pivotal screw 179. The stud 170 is accordingly shifted an amount to properly oppose the notch 175 of the lever 169 and the tongue 176 of the trigger plate 37. Thereafter, the nut associated with the spring washer 174 is tightened.

When the plunger 115 is pushed in, as described, in response to the actuation of the handle 157, an annular groove 180 in it, shown in Fig. 1, is moved into alinement with the bent latching lever 169. Thereupon the latching lever moves into the groove 180, since it is provided with a pin 181 that projects through a clearance hole in the wall 2, a spring 182, shown in Fig. 3, being anchored to a pin 183 that is secured to the wall 2. The spring 182 constantly urges the latching lever 169 in a direction to enter the plunger groove 180 whenever the latter is alined with the latching lever.

Upon the latching lever 169 entering the annular plunger groove 180, the walls of the notch 175 in the lever 169 are caused to embrace the tongue 176 of the trigger plate 37 as is clear from Fig. 2. Consequently, the trigger plate 37 is held against movement, and, through the stud 36, holds the cam member 26 also against movement. The spring 34, shown in Fig. 3, holds the cam portion 33 against the gimbal ring roller 32, as is evident from Figs. 3 and 6 and the previous description. Therefore, the gimbal ring 20 is restrained from movement, and it has been shown that the gimbal ring 20 and the gyroscope 16 are contemporaneously latched through the latching lever 164 and plate 167.

The connection between the trigger plate 37 and the bent lever 45 restrains the parts associated with the mirror 10 from turning about the trunnions 51 and 52, thus conserving the ball bearings 50.

When it is desired to place the stabilized sight into service, the rotor of the gyroscope 16 will be brought up to a sufficient speed, less than its normal rate of revolution, but great enough to insure adequate gyroscopic influence on the stabilized parts of the instrument. Thereafter, the handle 157 may be swung to the position shown in Figs. 2 and 7, and as this handle begins to move the spring 132, shown in Fig. 1 starts pulling on the upper end of the double arm lever 129, shown in Fig. 1. The lower end of the lever 129 shifts the gimbal ring 20 and the gyroscope 16 toward the right in Fig. 1, and presently the end of the latch plunger 161 leaves the end wall of the cam member 26. The latch arm 164, under the influence of the spring 163 withdraws its tongue 166 from the notch in the latch plate 167, as shown in Fig. 6, freeing the gyroscope 16 and the gimbal ring 20 from the restraint imposed by the previous latching of these elements.

During the shifting of the gyroscope 16 and the gimbal ring 20, the latter turns the lever 118 about its fulcrum 119, the lower end of this lever then pushing the plunger 115 outwardly. A bevelled side 184 of the groove 180 in the plunger 115 acts against the latching lever 169 to expel it from the groove 180, this effecting the release of the trigger plate 37 through the separation of the lever notch 175 and the trigger plate tongue 176.

The parts of the stabilized sight will now be in normal operating positions, and the axis of the rotor of the gyroscope will be in its proper vertical position as the latched parts are released from restraint so that the instrument is in condition for immediate operation without the necessity for precessing the gyroscope into a proper position, as might otherwise be required if it were started into action while swinging under the influence of the rolling of the ship.

What I claim is:—

1. In a fire-control instrument for use on an angularly moving body, a frame, a telescope combined therewith, a pivoted reflector associated with the telescope, an energizable gyroscope, a member connected with and stabilized by the gyroscope when it is energized, a reflector-controlling arm co-operatively associated with said member, and latching means operable to engage said member and retain it in predetermined relation to said frame when said gyroscope is de-energized.

2. In a fire-control instrument for use on an angularly moving body, a frame, a telescope, a pivoted reflector associated with the telescope, a gyroscope, a mounting for the gyroscope adapted to be stabilized thereby, a pivotally supported member, a stabilizing connection between said mounting and member operable to displace the latter, an arm extending from said reflector to and adjustably connected with said member, means operable to shift said mounting with respect to said frame thereby operating said connection to displace said member and to adjust said reflector, and a latching device operable by a further shifting of said mounting to mutually lock said gyroscope and mounting.

3. In a fire-control instrument for use on an angularly moving body, a frame, a telescope, a pivoted reflector associated with the telescope, a gyroscope, a gimbal ring for carrying the gyroscope so as to be stabilized thereby and slidable in said frame, interconnected rotary members angularly displaceable by a sliding of said gimbal ring, a controlling connection between one of said rotary members and said reflector, and means operable to latch one of said rotary members to said frame and said gyroscope to said gimbal ring.

4. In a fire-control instrument for use on an angularly moving body, a frame, a telescope, a pivoted reflector associated with the telescope, a gyroscope, a gimbal ring for carrying the gyroscope so as to be stabilized thereby and slidable in said frame, interconnected rotary member angularly displaceable by a sliding of said gimbal ring, a controlling connection between one of said rotary members and said reflector, latching devices for rigidly combining one of said rotary members with said frame and said gyroscope with said gimbal ring and mechanism operable to adjust said reflector and also to operate said latching devices.

5. In a fire-control instrument for use on an angularly moving body, a frame, a telescope, a pivoted reflector associated with the telescope, a gyroscope, a connection therefrom to said reflector comprising a stabilized gimbal ring, a rotary member normally under the control of said gimbal ring and an arm extending from said reflector to and co-acting with said member, a pivoted lever mounted on said frame, means for actuating said lever to operate said member and reflector arm to adjust said reflector, latching mechanism for the gyroscope, gimbal ring, member and reflector and means for independently actuating the lever to operate said mechanism.

6. In a fire-control instrument for use on an angularly moving body, a frame, a telescope, a pivoted reflector associated with the telescope, a gyroscope, a gimbal ring stabilized by the gyroscope and mounted in said frame to slide, a regulatory connection between said gimbal ring and reflector, latching mechanism for fixedly interconnecting said gyroscope, gimbal ring, regulatory connection and frame, means tending to move said gimbal ring in one direction, and controlling mechanism adapted to oppose such movement of the gimbal ring and operable to permit such movement and to move the gimbal ring in the opposite direction, said controlling mechanism comprising a lever and means for actuating the same to adjust said regulatory connection and reflector and to operate said latching mechanism.

7. In a fire-control instrument for use on an angularly moving body, a frame, a telescope, a pivoted reflector associated with the telescope, a gyroscope, a gimbal ring mounting the gyroscope and stabilized thereby and slidable in said frame, a regulatory connection between said gimbal ring and reflector, latching mechanism for fixedly combining said gyroscope, gimbal ring, regulatory connection and frame, means tending to thrust said gimbal ring in one direction, a gimbal ring shifter, and actuating means therefor including a lever, a setting device operable within limits to effect an adjustment of said regulatory connection and reflector and an actuator for differently positioning said lever to operate said latching mechanism.

8. In a fire-control instrument for use on an angularly moving body, a telescope, a pivoted reflector associated with the telescope, a gyroscope, a pivotally mounted member adapted to be stabilized thereby, an arm combined with said reflector and extending to and coupled with said member, a pivoted latch, and a device operable to maintain said latch in and out of interlocking engagement with said member.

9. In a fire-control instrument for use on an angularly moving body, a frame, a gyroscope, a mounting for the gyroscope adapted to be stabilized thereby with respect to the frame, firing mechanism including a pivotally mounted element yieldingly combined with the gyroscope mounting, a trigger connected to the element, a member movably mounted on the frame, means for adjusting the member including oppositely acting retaining devices, means for clamping the member in any desired position of adjustment, a contact device mounted on the member including a movable element and means operable by the trigger for actuating the element.

10. In a fire-control instrument for use on an angularly moving body, a frame, an energizable gyroscope, a member connected with and stabilized by the gyroscope when it is energized, firing mechanism including elements movable with the frame, elements under the control of the stabilized member and means coupling the first and second named elements permitting a change of relation therebetween but resisting such change upon de-energization of said gyroscope, and means for latching the member with respect to the frame when the gyroscope is de-energized.

11. In a fire-control instrument for use on an angularly moving body, a frame, an energizable gyroscope, a member connected with and stabilized by the gyroscope when it is energized, firing mechanism including elements movable with the frame, elements under the control of the stabilized member and means coupling the first and second named elements permitting the change of relation therebetween but resisting such change upon de-energization of said gyroscope, and means for latching the gyroscope with respect to the member when the gyroscope is de-energized.

12. In a fire-control instrument for use on an angularly moving body, a frame, an energizable gyroscope, a member connected with and stabilized by the gyroscope when it is energized, firing mechanism including elements movable with the frame, elements under the control of the stabilized member and means coupling the first and second named elements permitting a change of relation therebetween but resisting such change upon de-energization of said gyroscope, and means for latching the member with respect to the frame and the gyroscope with respect to the member when the gyroscope is de-energized.

13. In a fire-control instrument for use on an angularly moving body, a frame, a gyroscope, a mounting for the gyroscope adapted to be stabilized thereby when the gyroscope is energized, firing mechanism including relatively movable elements, a stabilizing connection between elements of the firing mechanism and the mounting, means operable to shift the mounting with respect to the frame thereby operating the connection to adjust the relation between the elements of the firing mechanism and latching means operable by further shifting of the mounting to latch the gyroscope therewith when it is de-energized.

14. In a fire-control instrument for use on an angularly moving body, a frame, a gyroscope, a mounting for the gyroscope adapted to be stabilized thereby when the gyroscope is energized, firing mechanism including relatively movable elements, a stabilizing connection between elements of the firing mechanism and the mounting, means operable to shift the mounting with respect to the frame thereby operating the connection to adjust the relation between the elements of the firing mechanism, means for latching the gyroscope to the mounting when it is de-energized, means for producing further shifting of the mounting to operate the latching means and means actuated by the last-named means for latching the stabilizing connection.

15. In a fire-control instrument for use on an angularly moving body, a frame, a telescope, a pivoted reflector associated with the telescope, a gyroscope, a mounting for the gyroscope adapted to be stabilized thereby, firing mechanism including a pivotally mounted element yieldingly combined with said gyroscope mounting, a trigger operable with said element, a pivotally mounted member rigidly connected with said element, an arm extending from said reflector to and adjustably coupled with said member, means to concurrently angularly displace said element and member to effect a simultaneous adjustment of said reflector and trigger, and means to latch the gyroscope to its mounting and the mounting to the frame.

16. In a fire-control instrument for use on an angularly moving body, a frame, a telescope, a pivoted reflector associated with the telescope, a gyroscope, a gimbal ring for the gyroscope stabilized thereby and having trunnions slidably mounted in said frame, the latter being adapted to turn about said trunnions, firing mechanism including a pivoted element having a cam and follower relation with said gimbal ring, a yielding connection between the latter and said element, a pivoted stabilized member combined with said element, an arm extending from said reflector to and coupled with said member, means for sliding said gimbal ring to alter said cam and follower relation between itself and said element to adjust said reflector and firing mechanism, means for actuating said gimbal ring, sliding means to produce further sliding of said gimbal ring, means actuated by such further movement of the gimbal ring to latch the gyroscope thereto and means actuated by the movement of the gimbal ring sliding means to latch the member.

17. In a fire-control instrument for use on an angularly moving body, a frame, an adjustable telescopic system carried thereby, a gimbal ring, trunnions slidably mounting the ring with respect to said frame and about which the latter is adapted to turn, a gyroscope pivoted in said gimbal ring, firing mechanism comprising electrically insulated contacts in fixed relation to said frame, a bridging contact, a shifting mounting therefor, an escapement controlling said mounting and including a trigger, a pivoted trigger-supporting member connected to said telescopic system and having a cam and follower relation with said gimbal ring, yielding means to render such relation normally inoperable, means for altering said cam and follower relation to effect an adjustment of said firing mechanism and telescopic system, means for producing additional action of said altering means, means brought into action by such additional action to latch the gyroscope to the gimbal ring and means actuated when the altering means is additionally actuated to latch the member to the frame.

18. In a fire-control instrument for use on an angularly moving body, a frame, an adjustable telescopic system carried thereby, a gimbal ring, trunnions slidably mounting the ring with respect to said frame and about which the latter is adapted to turn, a gyroscope pivoted in said gimbal ring, firing mechanism comprising electrically insulated contacts in fixed relation to said frame, a bridging contact, a shifting mounting therefor, an escapement controlling said mounting and including a trigger, a pivoted trigger-supporting member connected to said telescopic system and having a cam and follower relation with said gimbal ring, yielding means to render such relation normally inoperable, a lever pivoted on the frame, means actuated by the lever for altering the cam and follower relation to effect an adjustment of said firing mechanism and telescopic system, a screw device having a limited movement for operating the lever to effect said adjustment, means for actuating the lever independently of the screw device to produce an additional action of said altering means, a latch device brought into action by such additional action to latch the gyroscope to the gimbal ring and a latch actuated when the altering means is additionally actuated to latch the member to the frame.

In testimony whereof I affix my signature.

HANNIBAL C. FORD.